(12) United States Patent
Jasmin et al.

(10) Patent No.: US 7,684,665 B2
(45) Date of Patent: *Mar. 23, 2010

(54) METHODS AND SYSTEMS RELATING TO SOLID STATE LIGHT SOURCES FOR USE IN INDUSTRIAL PROCESSES

(75) Inventors: Roland Jasmin, Lake Oswego, OR (US); Mark D. Owen, Beaverton, OR (US); Alex Schreiner, Hillsboro, OR (US); Duwayne R. Anderson, Saint Helens, OR (US)

(73) Assignee: Phoseon Technology, Inc., Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/329,420

(22) Filed: Dec. 5, 2008

(65) Prior Publication Data
US 2009/0085046 A1 Apr. 2, 2009

Related U.S. Application Data

(63) Continuation of application No. 11/342,363, filed on Jan. 26, 2006, now Pat. No. 7,461,949, which is a continuation-in-part of application No. 10/984,589, filed on Nov. 8, 2004, which is a continuation-in-part of application No. PCT/US03/14625, filed on May 8, 2003.

(60) Provisional application No. 60/379,019, filed on May 8, 2002.

(51) Int. Cl.
*G02B 6/32* (2006.01)
(52) U.S. Cl. .............................. 385/33; 385/15; 385/31
(58) Field of Classification Search .................. 385/15, 385/31, 33
See application file for complete search history.

(56) References Cited

U.S. PATENT DOCUMENTS 4,485,123 A * 11/1984 Troue .......................... 427/492
7,461,949 B2 * 12/2008 Jasmin et al. .......... 362/249.16

* cited by examiner

*Primary Examiner*—Jennifer Doan
(74) *Attorney, Agent, or Firm*—Marger Johnson & McCollom, P.C.

(57) ABSTRACT

Methods and systems relating to solid state light sources for use in industrial processes.

6 Claims, 13 Drawing Sheets

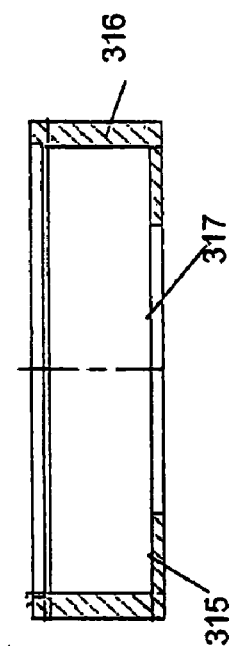
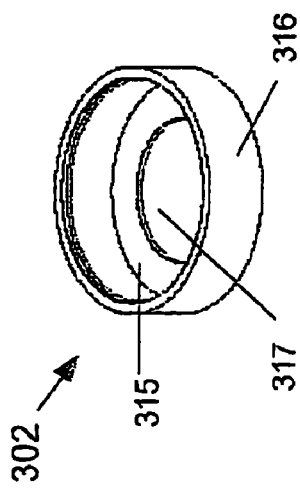
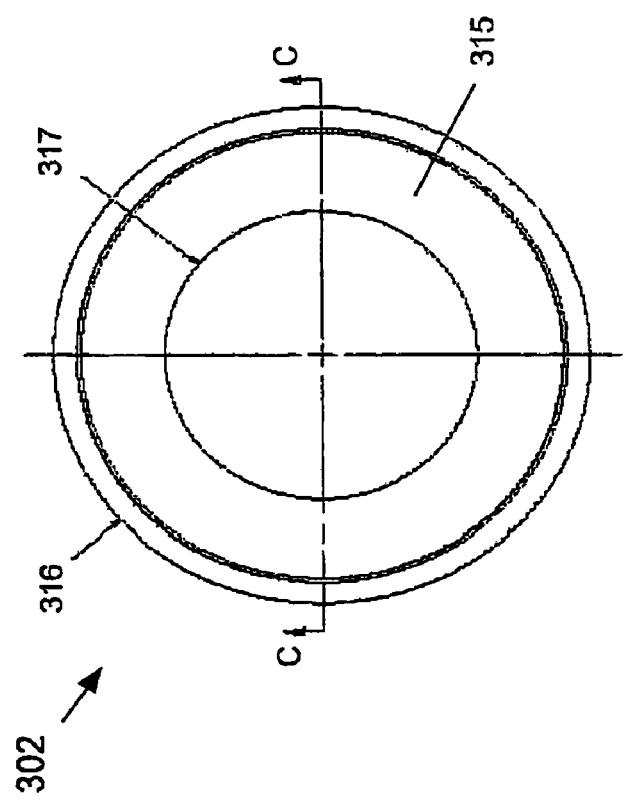
FIG. 6C
FIG. 6A
FIG. 6B

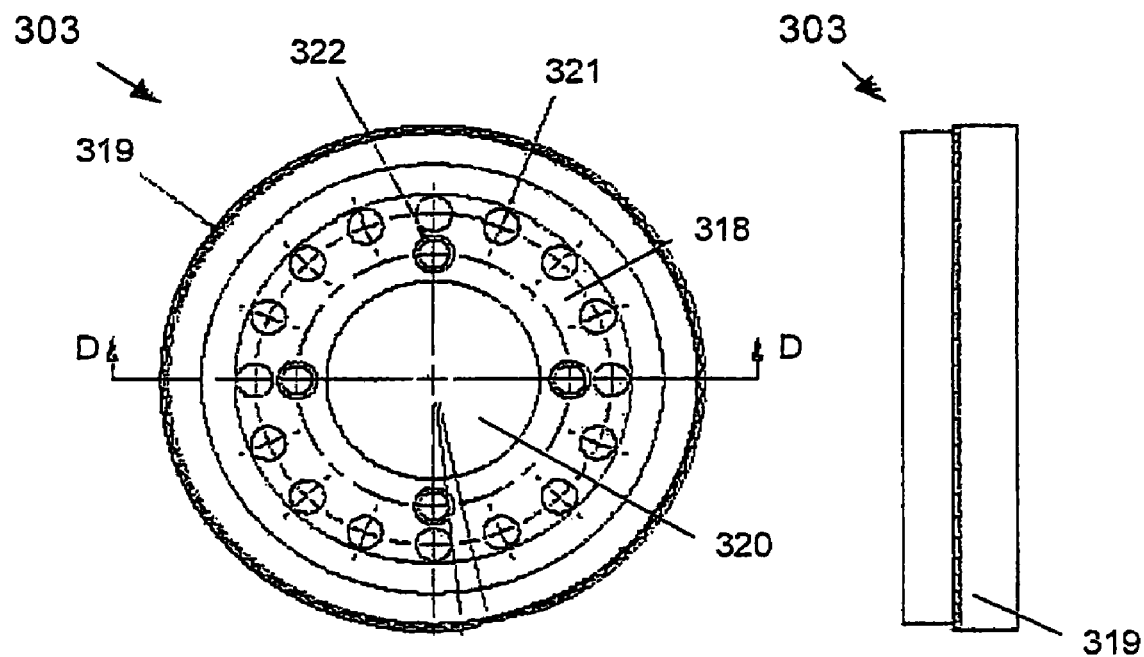
FIG. 7A
FIG. 7C
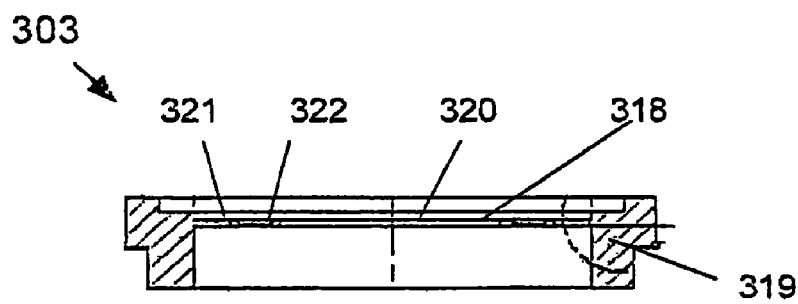
FIG. 7B

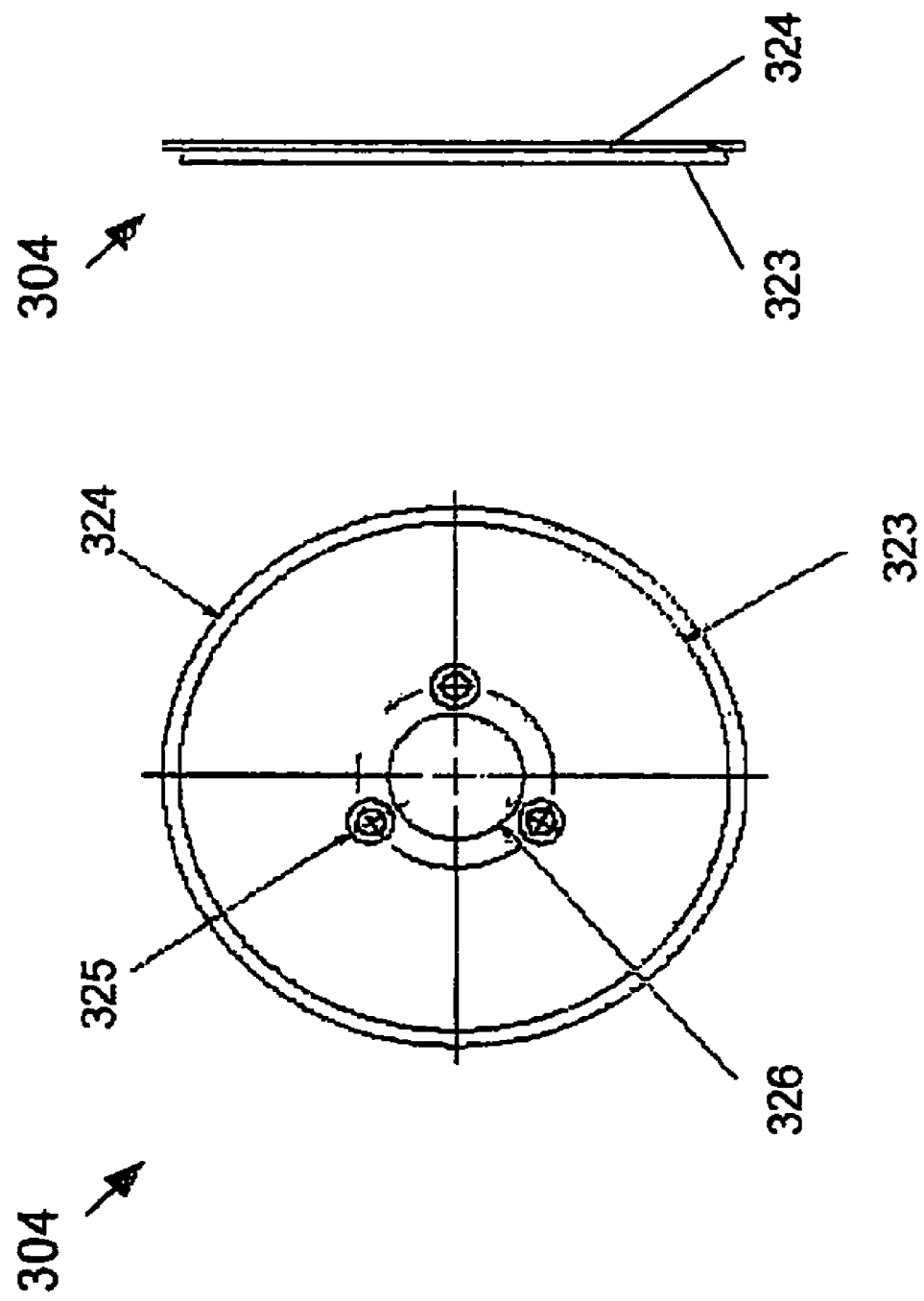

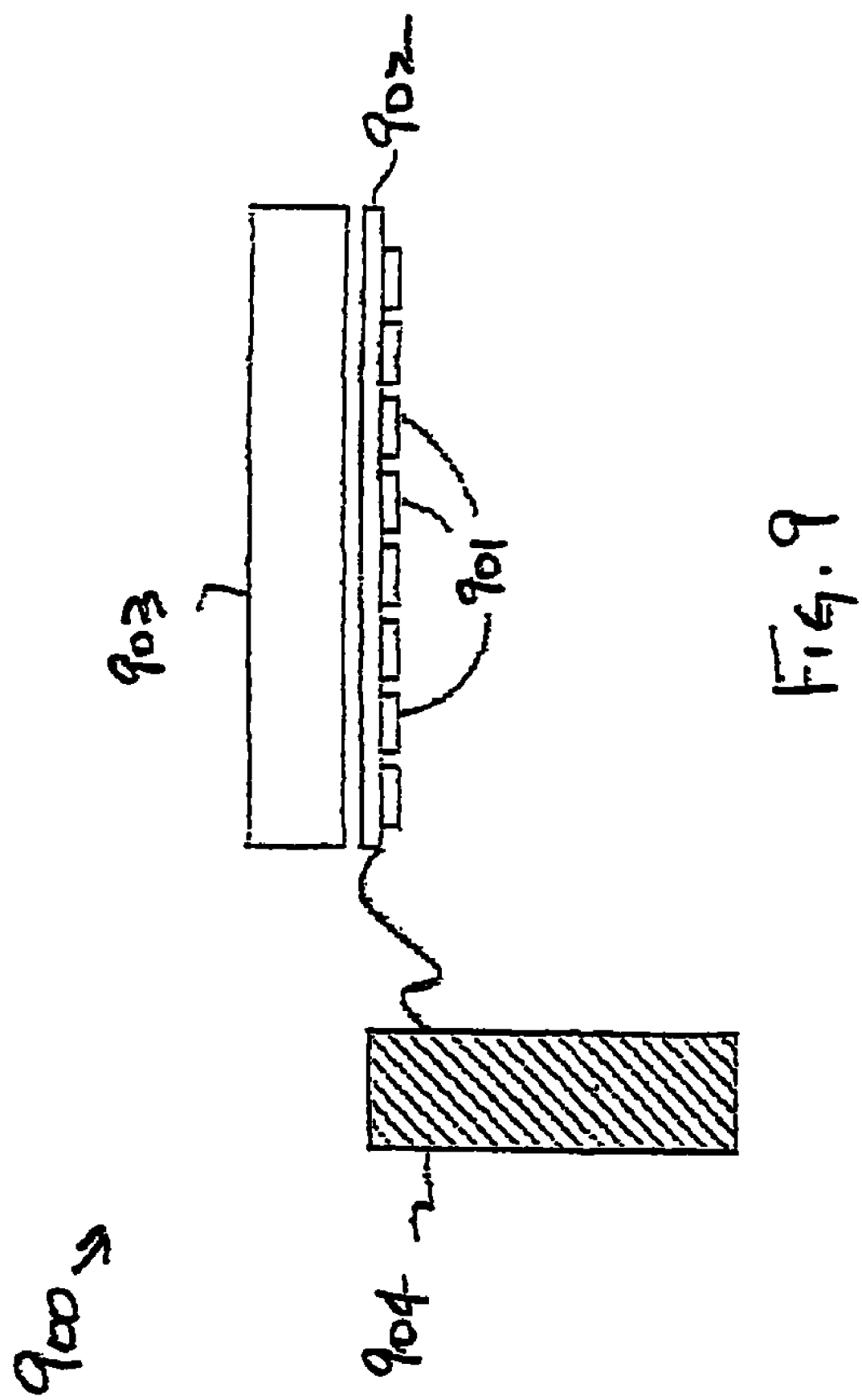

US 7,684,665 B2

METHODS AND SYSTEMS RELATING TO SOLID STATE LIGHT SOURCES FOR USE IN INDUSTRIAL PROCESSES

CROSS-REFERENCE TO RELATED APPLICATIONS

This application is a continuation of, and claims priority to, U.S. application Ser. No. 11/342,363 filed Jan. 26, 2006, which is a Continuation-in-Part of U.S. application Ser. No. 10/984,589, filed Nov. 8, 2004, entitled HIGH EFFICIENCY SOLID-STATE LIGHT SOURCE AND METHODS OF USE AND MANUFACTURE, which is a Continuation-in-Part of International Patent Application No. PCT/US2003/014625, filed May 8, 2003, entitled HIGH EFFICIENCY SOLID-STATE LIGHT SOURCE AND METHODS OF USE AND MANUFACTURE, which claims priority to and benefit of U.S. Provisional Patent Application No. 60/379,019, filed May 8, 2002, entitled HIGH EFFICIENCY SOLID STATE LIGHT SOURCE AND USE FOR MOLECULAR TRANSFORMATIONS IN A TARGET MATERIAL, each of which is hereby incorporated by reference as if recited in full herein for all purposes. U.S. application Ser. No. 11/342,363 filed Jan. 26, 2006, is also a Continuation-in-Part of International Patent Application No. PCT/US2005/047605, filed Dec. 29, 2005, entitled METHODS AND SYSTEMS RELATING TO LIGHT SOURCES FOR USE IN INDUSTRIAL PROCESSES, which claims priority to U.S. Provisional Patent Application No. 60/640,925, filed Dec. 30, 2004, entitled SOLID STATE UV CURING IN INERT OR OXYGEN REDUCED ENVIRONMENTS, and to U.S. Provisional Patent Application No. 60/647,749, filed Jan. 26, 2005, entitled METHODS AND SYSTEMS RELATING TO LIGHT SOURCES FOR USE IN INDUSTRIAL PROCESSES, each of which is hereby incorporated by reference as if recited in full herein for all purposes.

BACKGROUND

The inventive subject matter disclosed herein relates to light sources for use in industrial processes, such as for causing material transformation. The following description relates to one representative use of a solid-state light source. In certain aspects, the inventive subject matter disclosed herein relates to systems and methods directed to techniques for providing a fluid flow in association with a work surface that is the subject of a reactive process in the presence of light energy. Other aspects of the inventive subject matter are disclosed in the attached Appendix.

Light can be used to initiate various chemical reactions. Such light-initiated processes are a critical part of a number of industrial processes. The applicability of light as part of a particular process depends on several key properties of the light source, including, as examples, total optical power emitted by the source, wavelength(s) emitted by the source, source coherence, radiance of the source (power/area×steradian), degree of collimation, and power stability.

A particular application of light that has significant economic implications in today's industrial application is the polymerization, curing or other reaction as to adhesives and other light sensitive materials. The application of light may contemplate that the materials be irradiated through low transmittance layers. The application of light may contemplate that one or more specific wavelengths be employed. The application of light may contemplate that the light catalyze the reaction. The application of light generally contemplates that the light be absorbed by one or more materials employed in the process (e.g., adhesive). The application of light tends to also contemplate that the light either not be absorbed by one or more materials employed in the processed and/or, if absorbed undesirably, that any thermal or other undesirable aspects of that absorption be addressed (e.g., mitigation of undesirable heating of a work object). In any case, the application of light in association with the material that is to be bonded, sealed, or chemically altered by a polymerization or other reaction (e.g., with or without catalysis) presents a significant hurdle, and opportunities for advancement, in a number of industrial applications today.

In some chemical reactions, the presence of oxygen is detrimental to the chemical reaction. The detrimental effect of oxygen is well known in the industry. For example, a paper entitled "Nitrogen Inerting Benefits Thin UV Coating Cure," by Dr. L. Misev of Ciba Specialty Chemicals Inc., proposes that:

The presence of oxygen during the UV cure process can have a detrimental effect on the cure response of free radical systems. Oxygen reacts with the free radical and forms peroxy radicals by reaction with the photoinitiator, monomer or propagating chain radical. The reactivity of the peroxy radicals is insufficient to continue the free radical polymerization process, leading to chain termination and an under cured system.

Thin coatings, typically printing inks and overprint varnishes, are particularly affected because oxygen replenishment is most effective in the few micrometers below the film surface. This counteracts the increased photoinitiator radical formation resulting from highest UV light intensity at the film surface. Therefore, when UV curing takes place in air the degree of double bond conversion does not depend only on the light intensity distribution within a coating according to the Beer-Lambert law.

The degree of benefit from inerting, typically by nitrogen purging of the UV exposed ink or coating surface, depends on various factors and can be best determined under the specific processing conditions.

According to Dr. Misey, a technique for overcoming the problem of oxygen-inhibited cures is by removing the oxygen by smothering the coating surface with an oxygen-free gas, such as nitrogen.

Certain inerting techniques are proposed in other technical literature. For example, a paper entitled "Progress in Organic Coatings, Overcoming oxygen inhibition in UV-curing of acrylate coatings by carbon dioxide inerting: Part II," by K. Studer et al proposes:

The most effective way to overcome oxygen inhibition is to work in an inert atmosphere, by flushing the UV oven with nitrogen [6,7] or carbon dioxide [8]. The latter gas being heavier than air, it can be easily maintained in a container. As described by K. Studer et al., then, a common technique for inerting is to flush a container, apparently to immerse a work object in an inert atmosphere of nitrogen or carbon dioxide.

References to other technical literature appears to indicate that certain nitrogen-inerting techniques are known. See, for example, "DYNAMIC MECHANICAL ANALYSIS OF UV-CURABLE COATINGS WHILE CURING," by R. W. Johnson, DSM Desotech Inc., Elgin, Ill. 60120; R. Muller, in: Proceedings of the RadTech Europe Conference, 2001, p. 149 (referenced in Studer et al. as [6], as set forth above); and T. Henke, in: Proceedings of the RadTech Europe Conference, 2001, p. 145 (referenced in Studer et al. as [8], as set forth above.

In some circumstances, it is either unsafe or impractical to immerse a work object in an oxygen-depleted, inert atmosphere. For example, when the work object is in an environment that must be shared with people, such inerting would be unsafe to those people. In other situations, immersion inerting might be impractical, for example, when the work object is part of, or moved by, a fast-moving mechanical assembly. In these other situations, the moving machinery will tend to undesirably mix, distribute, or disperse the inerting atmosphere (e.g., mixing the inert atmosphere with oxygen, tending to be work at odds with the depletion function), and/or may require adaptable gaskets and seals for effective isolation (i.e., with attendant-ramifications, e.g., expenses, maintenance, etc.).

Such a situation is encountered when curing adhesives used for bonding materials together to form optical storage media. Representative of such media are a compact disk (CD) or digital versatile/video disk (DVD). A CD or a DVD (CD/DVD) is generally formed from two disc-shaped transparent pieces of material. The flat surface of one or both of the discs is typically coated with a reflective surface, which is typically formed from a metal. The coated, flat pieces are conventionally bonded together using a UV-curable adhesive resin.

FIGS. 2A-2C respectively depict cross-sectional views of three exemplary conventional DVDs 210, 220 and 230. Such conventional DVDs have a cross-section that is similar to a conventional CD. In particular, FIG. 2A depicts a cross-sectional view of a portion of a one-sided single-layer disc 210, which is commonly referred to as a DVD-5. A DVD-5 can contain up to 4.38 GBytes of data. As shown in FIG. 2A, DVD 210 includes two layers 211 and 212 of polycarbonate (PC) material that are each typically 600 microns thick. Sandwiched between polycarbonate layers 211 and 212 are a UV-curable resin layer 213 that is typically 20-50 microns thick and an aluminum layer 214 that is typically 45-60 nm thick. FIG. 2B depicts a cross-sectional view of a portion of a single-sided dual-layer disc 220, which is commonly referred to as a DVD-9. A DVD-9 can contain up to approximately 7.95 GBytes of data. Disc 220 includes two layers 221 and 222 of polycarbonate material that are each typically 600 microns thick. Sandwiched between polycarbonate layers 221 and 222 are an aluminum layer 223 that is typically 50-60 nm thick, a UV-curable resin layer 224 that is typically 40-70 microns thick, and a layer 225 formed from silicon, silver or gold that is typically 10-15 nm thick. FIG. 2C depicts a cross-sectional view of a portion of a dual-sided DVD disc 230, which is commonly referred to as a DVD-10. A DVD-10 can hold up to 8.75 GBytes of data with 4.38 GBytes on each side. Disc 230 includes two layers 231 and 232 of polycarbonate material that are each typically 600 microns thick. Sandwiched between polycarbonate layers 231 and 232 are a first aluminum layer 233 that is typically 50 nm thick, a UV-curable resin layer 234 that is typically 40-70 microns thick, and a second aluminum layer 235 that is typically 50 nm thick. These are representative optical storage discs and it is contemplated that these and other constructions vary depending on various factors (the factors including, e.g., the type and production facility). For example, in the constructions above, the reflective layer is sometimes chosen to be silicon.

A central aspect of the construction of optical storage media is that the components thereof are bonded together with adhesives. This aspect is understood to remain even though the materials or other nature of the components may change (e.g., as the industry moves to other standards like Blue Ray and HD-DVD (High Density Digital Versatile/Video Discs).

In a CD/DVD, the UV-curable adhesive resin directly between the two polycarbonate layers preferably is isolated from oxygen in the surrounding atmosphere and, therefore, the adverse effects caused by the presence oxygen may be eliminated. Even in that case, when the two polycarbonate layers are placed together with the UV-curable resin disposed in between, some of the resin may seep from, flow out of or otherwise be established outside the two polycarbonate layers and, therewith, form a bead on or along one or more circumferential edges of the polycarbonate layers (e.g., on or along the outside edge). The bead of resin on or along the edge may tend to be exposed to oxygen during the curing process. Depending on the particular resin used and the exposure to oxygen, incomplete curing may occur, producing an undesirable, "tacky" edge of the resulting CD/DVD.

The machinery used to manufacture CD/DVDs is complex and includes rapidly moving parts. Accordingly, this machinery is understood to be generally incompatible with immersion inerting, as proposed in the technical literature.

Another problem associated with CD/DVD manufacture is thermal loading of the polycarbonate layers when the adhesive resin layer between the polycarbonate layers is cured. Thermal loading of the polycarbonate layers may lead to deviations, or distortions, of the resulting CD/DVD (e.g., in the axial, lateral and thickness dimensions) that, in turn, generally leads to poor read/write characteristics of the resulting CD/DVD. Thermal loading may also result in undesirable chemical properties of the materials involved (e.g., modification of those properties). Additionally, as the CD/DVD industry migrates towards lower initiator concentrations and shorter wavelengths (higher energy radiation) for reading and writing information on CD/DVDs, two different power densities may be employed during adhesive curing operations: one power density for an aerobic environment (i.e., the oxygen-present environment at the edge of a CD/DVD) and another power density for an anaerobic environment (i.e., the oxygen-reduced or oxygen-lacking environment internal to the CD/DVD).

In other cases of curing, the desired results may be characterized and have parameters other than those desirable to manufacture of CD/DVD. As an example, in curing acrylate inks in digital graphics, the desired finish is to be dry and should have a high gloss. This can be achieved by dissipating a large amount of energy into the polymer ink formulations and/or by inerting methods. The print media tends to be composed of a variety of materials, and some can be addressed by a higher energy method, which methods generally are incompatible with other materials, e.g., plastics like polyvinylchloride, polyethylene, polypropylene, as well as various heat sensitive substrates.

The aforementioned challenges and problems in manufacturing optical storage media and digital graphics are representative of problems and challenges in industrial processing, particularly processing in the presence of light. Accordingly, there is a need for methods and systems that provide improved environmental conditions so as to foster such processing. Without limiting the more general need set forth above, as illustrated via the representative problems identified above, there is a need for inerting selected portions of a work piece or substrate. As an example, such inerting may be at a surface or edge of a work piece or substrate (e.g., a rapidly moving work piece or substrate) having associated therewith, or comprising, light curable materials, which materials may include UV-curable materials, such as inks, coatings, or adhesives, such that, a reaction is properly effected (e.g., the reaction initiates, proceeds and/or is completed without or substantially without detrimental effects, such as those caused by the presence of oxygen or other inhibitor, or other impurity, contaminant or material, if present or present at or above a particular metrics, will be at odds with the reaction).

Additionally, a technique is needed for providing light in the context of the above inerting. Additionally, a technique is needed for providing variable light attributes during a photoreaction for a substrate or work piece that has different, environmental, physical or chemical properties, for example, a work piece or substrate having an aerobic environment and an anaerobic environment.

What is needed is a technique for enabling a reaction at or below a surface of a work piece, in which a fluid flow is provided in association with such surface of the work piece and, in the context of the work piece being exposed to a light, the reaction is fostered at or below the surface of the work piece. In additional, what is needed is a technique for enabling a reaction, as stated above, wherein the reaction is a photoreaction relating to the light exposure.

SUMMARY

In exemplary embodiments, the inventive subject matter disclosed herein provides systems and methods for a reaction at or below a selected portion of a surface of a work piece such that a fluid flow is created to foster the reaction. In these embodiments, the reaction may be a photoreaction (e.g., a reaction associated with application of light energy). (As used in this application, (a) "fluid flow" means flow of one or more selected fluids, at one or more selected times, over or otherwise in association with at least one selected surface of a work piece or substrate, so as to foster a particular reaction; and (b) "foster" means to promote, enable or otherwise contribute to a reaction so that such reaction is properly effected (e.g., the reaction initiates, proceeds and/or is completed without or substantially without inhibition, interference or other detrimental effects, such as those caused by the presence of oxygen or other inhibitor and/or, as the case may be, other impurity, contaminant or material which, if present or present at or above a particular metric, may be at odds with the reaction).)

In exemplary embodiments, a reaction is fostered by creating fluid flow in association with at least one selected portion of a work object. The fluid flow may be associated with the selected portion by a selected fluid flowing over the selected portion.

In exemplary embodiments, the fluid may comprise an inerting fluid. Examples of such inerting fluid include nitrogen or other inert gas or liquid, alone or in combinations. Examples of such inerting fluid also include gases or liquids selected to react with oxygen or other inhibitor or material(s), so as to produce an inert product (e.g., a product that will not inhibit the reaction or otherwise be at odds with fostering the reaction).

In exemplary embodiments, the fluid may comprise a reactive species. In such embodiments, that fluid reacts (e.g., photoreacts) with another species in a predetermined manner. Such another species typically is a component of, or is used in making, the work object. Such another species may also be an inhibitor, an impurity, a contaminant or other undesirable material.

In exemplary embodiments, the fluid may comprise a catalytic species that catalyzes the reaction (e.g., a photoreaction) in a predetermined manner.

In exemplary embodiments, the fluid may comprise combinations of one or more inerting, reactive, catalytic or other species. Any such combination may be provided at once (e.g., in mixtures or other chemical combinations), in sequences (e.g., separately or in mixtures or other combinations), or both. Any such combination may be provided variously over different portions of the work piece whether at once, in sequence or both.

In exemplary embodiments, the reaction comprises a photoreaction employing a selected light source. The selected light source may be any known light source, for providing light appropriate to the photoreaction. Such light source, generally, addresses various parameters, e.g., particular wavelength(s) and power for a particular photoreaction.

In exemplary embodiments, the light source is a solid state light source. Without limiting the generality of the foregoing, the solid state light source may comprise a dense array of light emitting diodes (LEDs).

In an exemplary embodiment, fluid flow provides a desired inerting agent or reactive species at least one selected portion of a surface of a work piece to displace, remove or otherwise substantially mitigate or overcome the action of a predetermined agent that inhibits, interferes with, has a detrimental effect on or otherwise is at odds with a photochemical reaction or other predetermined reaction or processing at or in the surface of the work piece or substrate.

In another exemplary embodiment, the fluid combines with another species to form one of an inerting, reacting or catalytic species. In another exemplary embodiment, the fluid flow can be a unidirectional fluid flow. In still another exemplary embodiment, fluid flow can be a multi-direction fluid flow (e.g., flowing in two directions at the same time, typically at two different locations and/or flowing in one direction at one time and in another direction at another time). In yet another exemplary embodiment can a radial fluid flow. In a further exemplary embodiment, the fluid flow can be without or without substantial turbulence (in such case, the fluid flow may be referred to herein as "laminar flow"). Alternatively, the fluid flow can be with a selected degree of turbulence.

In other exemplary embodiments, the fluid its flow direction and nature, and other of its parameters may be selected, so as to provide one or more characteristics. Such selections typically are in the context of application of the fluid flow. As examples of this contextual selection, such selections typically respond to the reaction, the work product's components, the environment (including inhibitors and other materials), and the light source. Such selections are contemplated to include any one or more of the above-described types of fluids, flow directions, flow natures and other parameters, together or separately from other fluid types, flow directions, flow natures and other parameters.

Advantages of the inventive subject matter disclosed herein are provided by a device and a method for enabling a reaction (e.g., a photoreaction) at or below a surface of a work piece or substrate, in which a fluid flow is provided over or otherwise in association with such surface of the work piece, the work piece being exposed to a light source, so as to foster the reaction at or below the surface of the work piece or substrate. In one exemplary embodiment, the fluid comprises an inerting species, and the reaction is a photoreaction that would be in an aerobic environment, but for the fluid flow. The inerting species could be, for example, nitrogen, carbon dioxide, argon and/or helium. In another exemplary embodiment, the reaction is for a polymerization reaction. In still another exemplary embodiment, the fluid comprises a reactive species. In yet a further exemplary embodiment, the fluid comprises a catalytic species. In one exemplary embodiment, the fluid flow is substantially parallel to a portion of the work piece.

The reaction (e.g., a photoreaction) could be for curing an ink formation on a substrate. Alternatively, the reaction could be for curing a coating on a work piece. As yet another alternative, the reaction could be for setting an ink.

In one exemplary embodiment, the work piece includes first and second layers of material and a third layer of material between the first and second layers, and the reaction (e.g., photoreaction) enables the third layer of material to bond the first and second layers of material together. For example, the work piece could comprise a precursor for optical storage media, such as a CD-type device, a DVD-type device, a Blue Ray DVD-type device or an HD-DVD-type device.

In another exemplary embodiment, the light comprises one or more wavelengths of between about 250 nm and 450 nm. In one instance of such embodiment, the light is generated by a light source comprising a solid-state light source. Alternatively, the light source could comprise a dense array of solid-state light sources.

The inventive subject matter disclosed herein also provides various methods directed to fluid flow. In an example embodiment, a method is provided for applying inert fluid, such as nitrogen, carbon dioxide, or the like, to the edge of a rapidly moving substrate involving UV-cured materials, such as inks, coatings, or adhesives, so that a chemical reaction can be fostered (e.g., without being exposed to, or otherwise mitigating, the detrimental effects caused by the presence of oxygen). In such example method, the inert fluid may provide a layer in association with the edge.

Additionally, the inventive subject matter disclosed herein provides a method for providing different power densities of light in connection with a photoreaction. In such example method, the different power densities of light may be provided at different times or at different locations of a work piece, or combinations of same. In a particular instance of such method, the work piece may have an aerobic environment and an anaerobic environment, and the power densities may be selectively applied as to each such environment.

BRIEF DESCRIPTION OF THE DRAWINGS

The foregoing is not intended to be an exhaustive list of embodiments and inventive subject matter disclosed herein. The inventive subject matter disclosed herein is illustrated by way of example and not by limitation in the accompanying figures in which like reference numerals indicate similar elements and in which:

FIG. 6A depicts a top view of an exemplary embodiment of the outer ring member shown in FIGS. 3A and 3B;

FIG. 6B depicts a-cross-sectional view of the exemplary embodiment of the outer ring member shown in FIG. 6A taken along line C-C;

FIG. 6C depicts a perspective view of the exemplary embodiment of the outer ring member shown in FIG. 6A;

FIG. 7A depicts a top view of an exemplary embodiment of the inner ring member shown in FIGS. 3A and 3B;

FIG. 7B depicts a cross-sectional view of the exemplary embodiment of the inner ring member shown in FIG. 7A taken along line D-D;

FIG. 7C depicts a side view of the exemplary embodiment of the inner ring member shown in FIG. 7A;

FIG. 8A depicts a top view of an exemplary embodiment of the platter shown in FIGS. 3A and 3B;

FIG. 8B depicts a side view of the exemplary embodiment of the platter shown in FIG. 8A;

FIG. 9 illustrates a basic construction of an exemplary embodiment of a lighting module having a plurality of solid-state light emitters.

DETAILED DESCRIPTION

Figure 1:
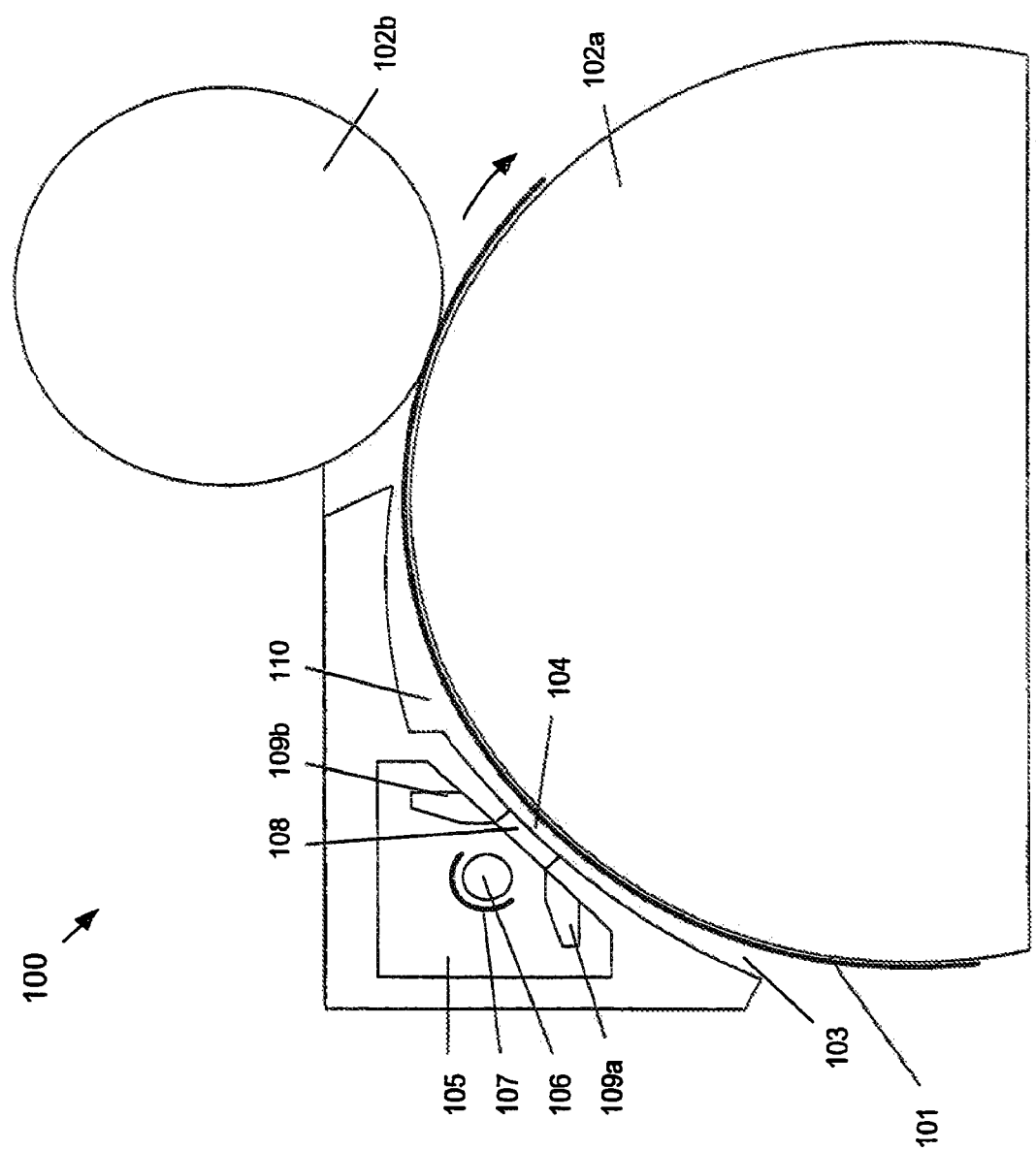
FIG. 1 depicts an exemplary UV-light curing process.
Figure 2A:
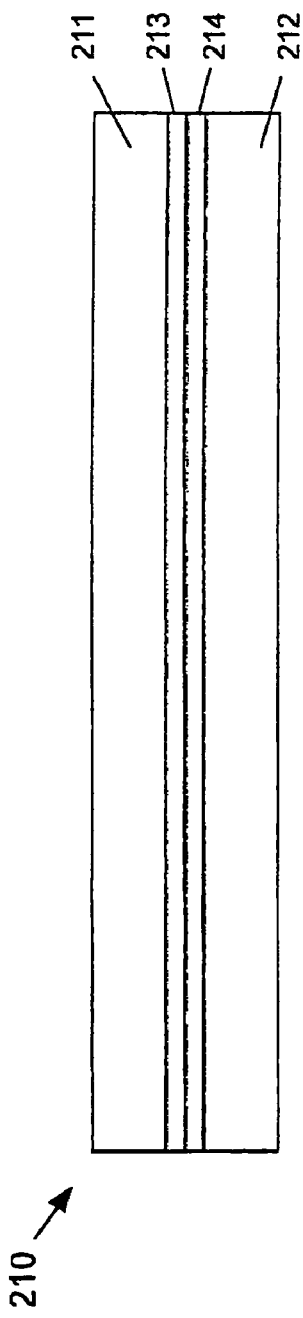
FIG. 2A depicts a cross-sectional view of a portion of a one-sided single-layer disc, which is commonly referred to as a DVD-5.
Figure 2B:
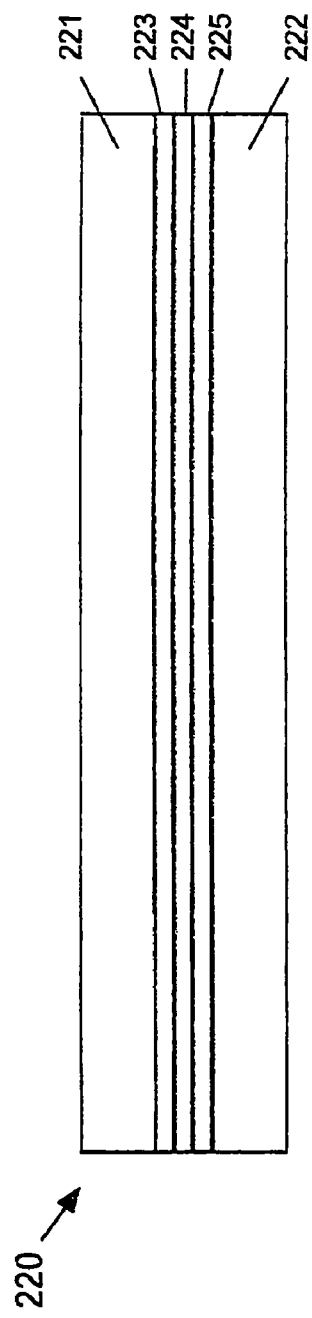
FIG. 2B depicts a cross-sectional view of a portion of a single-sided dual-layer disc, which is commonly referred to as a DVD-9.
Figure 2C:
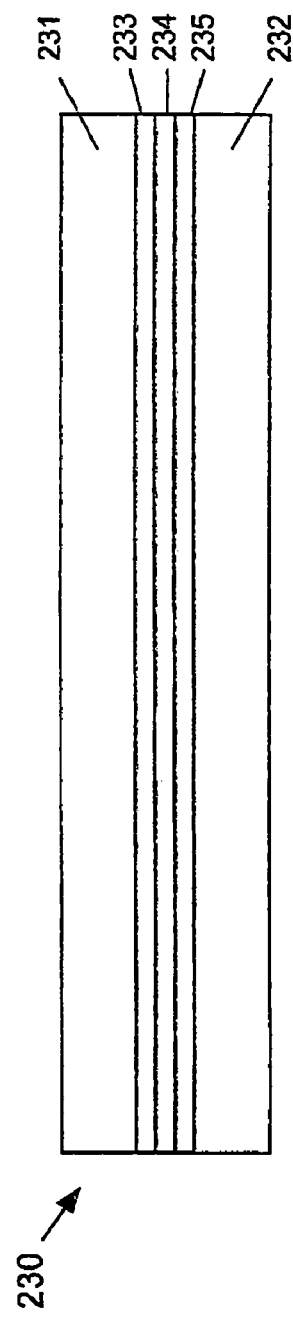
FIG. 2C depicts a cross-sectional view of a portion of a dual-sided DVD disc, which is commonly referred to as a DVD-10.

The inventive concepts disclosed herein overcome the problems and challenges in the prior art by providing methods and systems that are adaptable to varying environmental, physical, and chemical conditions for a reaction, photoreaction or other processing (e.g., photo-processing). Principles of the exemplary embodiments of the inventive subject matter disclosed herein are illustrated in the following discussion.

In one or more exemplary embodiments, the inventive subject matter disclosed herein provides systems and methods in connection with a reaction at or below a selected portion of a surface of a work piece such that a fluid flow is created to foster the reaction. In these embodiments, the reaction may be a photoreaction (e.g., a reaction associated with application of light energy). (As used in this application, (a) "fluid flow" means flow of one or more selected fluids, at one or more selected times, over or otherwise in association with at least one selected surface of a work piece or substrate, so as to foster a particular reaction; and (b) "foster" means to promote, enable or otherwise contribute to a reaction so that such reaction is properly effected (e.g., the reaction initiates, proceeds and/or is completed without or substantially without inhibition, interference or other detrimental effects, such as those caused by the presence of oxygen or other inhibitor and/or, as the case may be, other impurity, contaminant or material which, if present or present at or above a particular metric, may be at odds with the reaction).)

In exemplary embodiments, a reaction is fostered by creating fluid flow in association with at least one selected portion of a work object. The fluid flow may be associated with the selected portion by a selected fluid flowing over the selected portion.

In exemplary embodiments, the fluid may comprise an inerting fluid. Examples of such inerting fluid include nitrogen or other inert gas or liquid, alone or in combinations. Examples of such inerting fluid also include gases or liquids selected to react with oxygen or other inhibitor or material(s), so as to produce an inert product (e.g., a product that will not inhibit the reaction or otherwise be at odds with fostering the reaction).

In exemplary embodiments, the fluid may comprise a reactive species. In such embodiments, that fluid reacts (e.g., photoreacts) with another species in a predetermined manner. Such another species typically is a component of, or is used in making, the work object. Such another species may also be an inhibitor, an impurity, a contaminant or other undesirable material.

In exemplary embodiments, the fluid may comprise a catalytic species that catalyzes the reaction (e.g., a photoreaction) in a predetermined manner.

In exemplary embodiments, the fluid may comprise combinations of one or more inerting, reactive, catalytic or other species. Any such combination may be provided at once (e.g., in mixtures or other chemical combinations), in sequences (e.g., separately or in mixtures or other combinations), or both. Any such combination may be provided variously over different portions of the work piece whether at once, in sequence or both.

In exemplary embodiments, the reaction comprises a photoreaction employing a selected light source. The selected light source may be any known light source, for providing light appropriate to the photoreaction. Such light source, generally, addresses various parameters, e.g., particular wavelength(s) and power for a particular photoreaction.

In exemplary embodiments, the light source is a solid state light source. Without limiting the generality of the foregoing, the solid state light source may comprise a dense array of light emitting diodes (LEDs). In such case, the dense array may be implemented so as to emit light of a selected wavelength, of selected wavelengths or in a selected band of wavelengths. Moreover, such dense array generally is implemented so as to provide a selected light power density, e.g., at the work piece. In addition, such dense array generally is implemented so as to control undesirable heating (e.g., of the work piece), including, as an example, in emitting light of selected wavelength(s) (e.g., by not emitting, or substantially so, other wavelengths).

In an exemplary embodiment, fluid flow provides a desired inerting agent or reactive species at least one selected portion of a surface of a work piece to displace, remove or otherwise substantially mitigate or overcome the action of a predetermined agent that inhibits, interferes with, has a detrimental effect on or otherwise is at odds with a photochemical reaction or other predetermined reaction or processing at or in the surface of the work piece or substrate.

In another exemplary embodiment, the fluid combines with another species to form one of an inerting, reacting or catalytic species. In another exemplary embodiment, the fluid flow can be a unidirectional fluid flow. In still another exemplary embodiment, fluid flow can be a multi-direction fluid flow (e.g., flowing in two directions at the same time, typically at two different locations and/or flowing in one direction at one time and in another direction at another time). In yet another exemplary embodiment can be a radial fluid flow. In a further exemplary embodiment, the fluid flow can be without or without substantial turbulence (in such case, the fluid flow may be referred to herein as "laminar flow"). Alternatively, the fluid flow can be with a selected degree of turbulence.

In other exemplary embodiments, the fluid its flow direction and nature, and other of its parameters may be selected, so as to provide one or more characteristics. Such selections typically are in the context of application of the fluid flow. As examples of this contextual selection, such selections typically respond to the reaction, the work product's components, the environment (including inhibitors and other materials), and the light source. Such selections are contemplated to include any one or more of the above-described types of fluids, flow directions, flow natures and other parameters, together or separately from other fluid types, flow directions, flow natures and other parameters.

Advantages of the inventive subject matter disclosed herein are provided by a device and a method for enabling a reaction (e.g., a photoreaction) at or below a surface of a work piece or substrate, in which a fluid flow is provided over or otherwise in association with such surface of the work piece, the work piece being exposed to a light source, so as to foster the reaction at or below the surface of the work piece or substrate. In one exemplary embodiment, the fluid comprises an inerting species, and the reaction is a photoreaction that would be in an aerobic environment, but for the fluid flow. The inerting species could be, for example, nitrogen, carbon dioxide, argon and/or helium. In another exemplary embodiment, the reaction is for a polymerization reaction. In still another exemplary embodiment, the fluid comprises a reactive species. In yet a further exemplary embodiment, the fluid comprises a catalytic species. In one exemplary embodiment, the fluid flow is substantially parallel to a portion of the work piece.

The reaction (e.g., a photoreaction) could be for curing an ink formation on a substrate. Alternatively, the reaction could be for curing a coating on a work piece. As yet another alternative, the reaction could be for setting an ink.

In one exemplary embodiment, the work piece includes first and second layers of material and a third layer of material between the first and second layers, and the reaction (e.g., photoreaction) enables the third layer of material to bond the first and second layers of material together. For example, the work piece could comprise a precursor for optical storage media, such as a CD-type device, a DVD-type device, a Blue Ray DVD-type device or an HD-DVD-type device.

In another exemplary embodiment, the light comprises one or more wavelengths of between about 250 nm and 450 nm. In one instance of such embodiment, the light is generated by a light source comprising a solid-state light source. Alternatively, the light source could comprise a dense array of solid-state light sources.

The inventive subject matter disclosed herein also provides various methods directed to fluid flow. In an example embodiment, a method is provided for applying inert fluid, such as nitrogen, carbon dioxide, or the like, to the edge of a rapidly moving substrate involving UV-cured materials, such as inks, coatings, or adhesives, so that a chemical reaction can be fostered (e.g., without being exposed to, or otherwise mitigating, the detrimental effects caused by the presence of oxygen). In such example method, the inert fluid may provide a layer in association with the edge.

Additionally, the inventive subject matter disclosed herein provides a method for providing different power densities of light in connection with a photoreaction. In such example method, the different power densities of light may be provided at different times or at different locations of a work piece, or combinations of same. In a particular instance of such method, the work piece may have an aerobic environment and an anaerobic environment, and the power densities may be selectively applied as to each such environment.

Principles of the inventive subject matter disclosed herein are illustrated in the following discussion, including in connection with of an exemplary photoreaction in which an inerting fluid is applied in a fluid flow for fostering a photoreaction at the surface of or within a work object that is exposed to an appropriate form of electromagnetic radiation, such as light having one or more selected wavelengths. It is to be understood that this illustrative example is not intended to be limiting as to the scope of the inventive subject matter hereof. For example, although the illustrative example embodiment below discloses particular ways to use an inerting fluid and, particularly, nitrogen, it is understood that other fluids and/or combinations of fluids may be employed and in ways different ways (e.g., as such fluids and ways are disclosed above).

Moreover, conventional techniques of using nitrogen inerting for overcoming the problems of oxygen inhibition in processes involving UV curing includes immersing the reacting chemicals in a nitrogen bath or flooding the surface to reduce oxygen. None of the conventional methods, however, are applicable to the requirements involved in curing the edge of, for example, a CD/DVD or graphic media. Moreover, it is understood that these conventional methods generally implicate a form of static inerting (e.g., providing a container filled a set volume of inerting fluid, but absent the fluid flow disclosed herein).

FIG. 1 depicts an exemplary UV-light curing process 100. In FIG. 1, a material sheet, or work piece, 101 is gripped and moved in a clockwise direction in FIG. 1 by moving machinery formed by two roller members 102a and 102b (only a portion of roller member 102a is shown). As material sheet 101 moves, material sheet 101 passes through an oxygen reduced area 103 toward a UV-light exposure area 104. A UV-light source 105 that produces UV light for exposing sheet 101 includes a UV lamp 106, a CMK (cold mirror) reflector 107, a quartz-glass plate 108 and water-cooled shutters 109a and 109b (shown in an open position). After being exposed to the UV light, material sheet 101 passes through a nitrogen chamber 110.

Historically, a UV-light source that has been used for causing a chemical photoreaction has been an arc lamp having very high power consumption and outputting significant amounts of infrared radiation, resulting in an unacceptable temperature rise of a CD/DVD or graphic media. Absorption of excess heat is particularly damaging in a CD/DVD manufacturing process because the excess heat can cause the discs and print media to warp during the curing process, thereby rendering them unacceptable. Approaches for overcoming this problem include use of as shutters and filters, both of which are complicated, expensive, and require complex cooling systems. In addition to this, the production processes usually cannot accommodate a reservoir of inerting gas and must use purging of a larger volume, which is costly and may effect the work environment in terms of hazardous conditions.

Solid-state UV-light sources are contemplated that emit electromagnetic radiation that is concentrated in the UV spectrum (i.e., to a greater degree than the electromagnetic radiation emitted from mercury vapor arc lamps). Because such solid-state UV-light sources essentially emit no infrared radiation, the temperature rise of a CD/DVD is not greater than the temperature rise that is intrinsically inherent from the absorption of UV radiation required for the photoreaction. Such UV-light sources typically include a semiconductor in which the band gap energy is chosen by proper selection of the semiconductor material so that UV photons are emitted when electrical current is passed through the junction of the semiconductor. Such solid-state UV-light sources are advantageous replacements for the arc lamp systems currently in use including when curing the bulk material between the two discs of a CD/DVD.

When conventional CD/DVD manufacturing techniques are used, a thin bead of resin may form on or along the edge of a CD/DVD, which bead may be exposed to oxygen, and because of the exposure to oxygen, this bead may be difficult to cure so as to obtain a non-tacky cure (e.g., depending on the particular resin used). To overcome this problem, the inventive subject matter disclosed herein provides a mechanism for surrounding the edge of a CD/DVD with an inert atmosphere (e.g., of nitrogen), even when the CD/DVD is rotating quickly and/or moving in a complicated, irregular pattern (i.e., non-uniform manner) through curing machinery. In one exemplary embodiment, the inventive subject matter disclosed herein provides a directed fluid-flow jet of nitrogen (though carbon dioxide or other inert gases could be use) encased in the mechanical assembly that holds and transports a CD/DVD through its stages of manufacture. It should be understood, though, that the inventive subject matter disclosed herein is not limited to use with nitrogen and that carbon dioxide and other inerting gases and/or fluids could be used.

There are various problems to be overcome when applying an inert atmosphere to the edge of a CD/DVD. First, in order to achieve uniform light exposure over the entire CD for the photoreactive process, the CD/DVD is kept spinning during exposure by an electric motor that is coupled to the spindle or a platter on which the CD/DVD is placed. A spinning motion, however, results in mixing of the inerting fluid with oxygen. Consequently, a simplistic approach of merely aiming nitrogen jets at the edge of a spinning CD results in sufficient turbulence that excess oxygen generally may be mixed in with the nitrogen, such that the resulting oxygen concentration is sufficiently large so that an impaired cure is not avoided. Immersing the entire assembly in nitrogen generally is not practical because the manufacturing volume is too large, and because humans must be able to access the processing area without risk to their health.

According to the inventive subject matter disclosed herein, a fixture provides a fluid flow of nitrogen that is applied to the edge of a CD/DVD. The fixture provides precise control of the nitrogen-delivery system so that the conditions of flow persist with a low Reynolds Number that is not indicative of a turbulent flow (e.g., so as to establish a laminar flow). By using fluid-flow jets according to the inventive subject matter disclosed herein, the edge of a CD/DVD is immersed in a blanket of nitrogen, thereby overcoming the problem of oxygen inhibition as it relates to UV-curing of the adhesive resin used to form the CD/DVD.

Figure 3A:
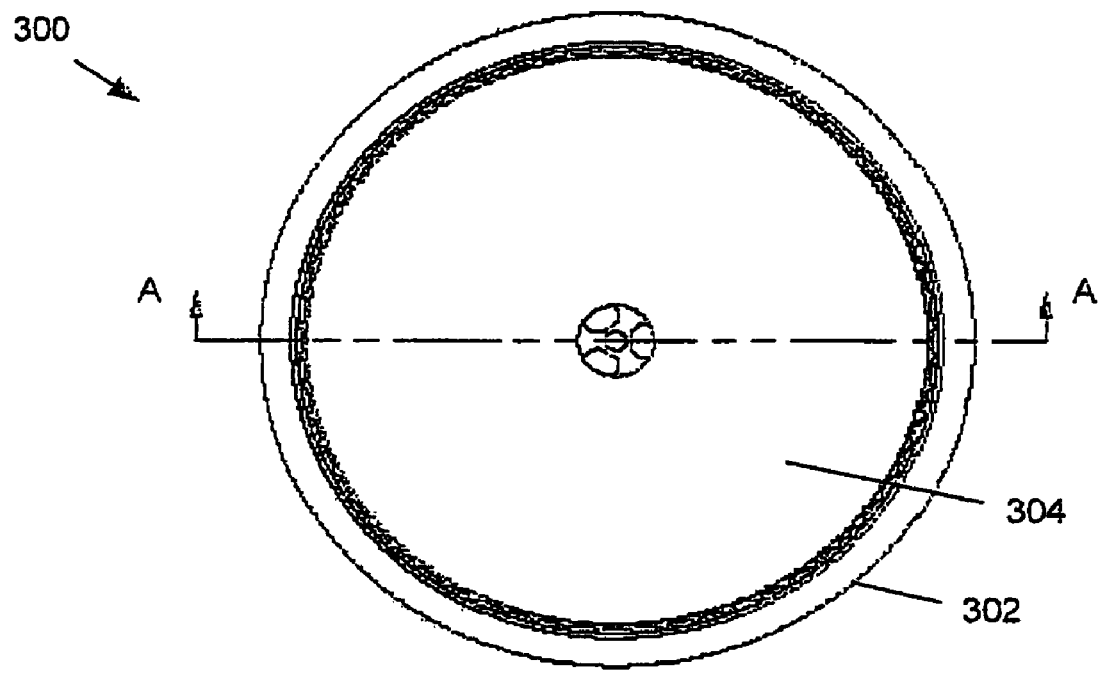
FIG. 3A depicts a top view of an exemplary embodiment of a fixture for a fluid flow process.
Figure 3B:
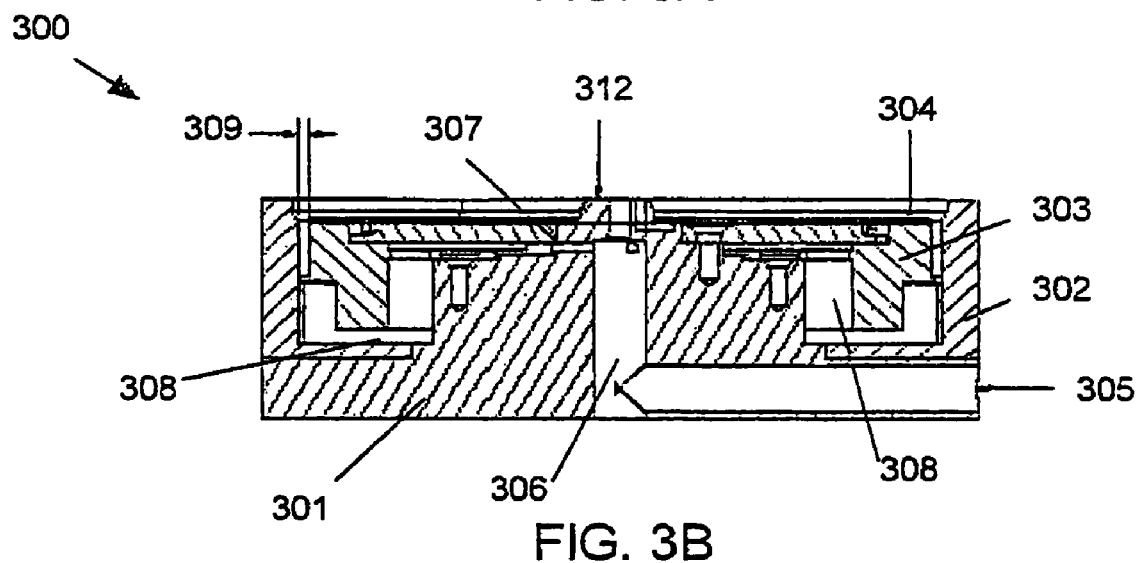
FIG. 3B depicts a cross-sectional view of the exemplary embodiment of fixture taken along line A-A in FIG. 3A.

FIG. 3A depicts a top view of an exemplary embodiment of a fixture 300 for a fluid-flow process according to the inventive subject matter disclosed herein. FIG. 3B depicts a cross-sectional view of the exemplary embodiment of fixture 300 taken along line A-A in FIG. 3A. Fixture 300 includes a spindle base 301, an outer ring member 302, an inner ring member 303, and a platter 304. Spindle base 301 includes a first radially oriented fluid channel 305 that is coupled to a longitudinally oriented fluid channel 306. As used with respect to exemplary fixture 300, the phrase "radially oriented" means in a direction that is substantially in a radial direction from spindle 312 (FIG. 3B) as viewed in FIG. 3A. Additionally, with respect to exemplary fixture 300, the phrase "longitudinally oriented" means in a direction that is substantially in vertical direction as viewed in FIG. 3B. Longitudinally oriented fluid channel 306 is coupled to a second radially oriented fluid channel 307. Fluid channel 307 is coupled to fluid cavity 308. Fluid cavity 308 is coupled to a gap, or flow channel, 309 between outer ring member 302 and inner ring member 303. In one exemplary embodiment, width of flow channel 309 is nominally 2 mm.

Figure 4:
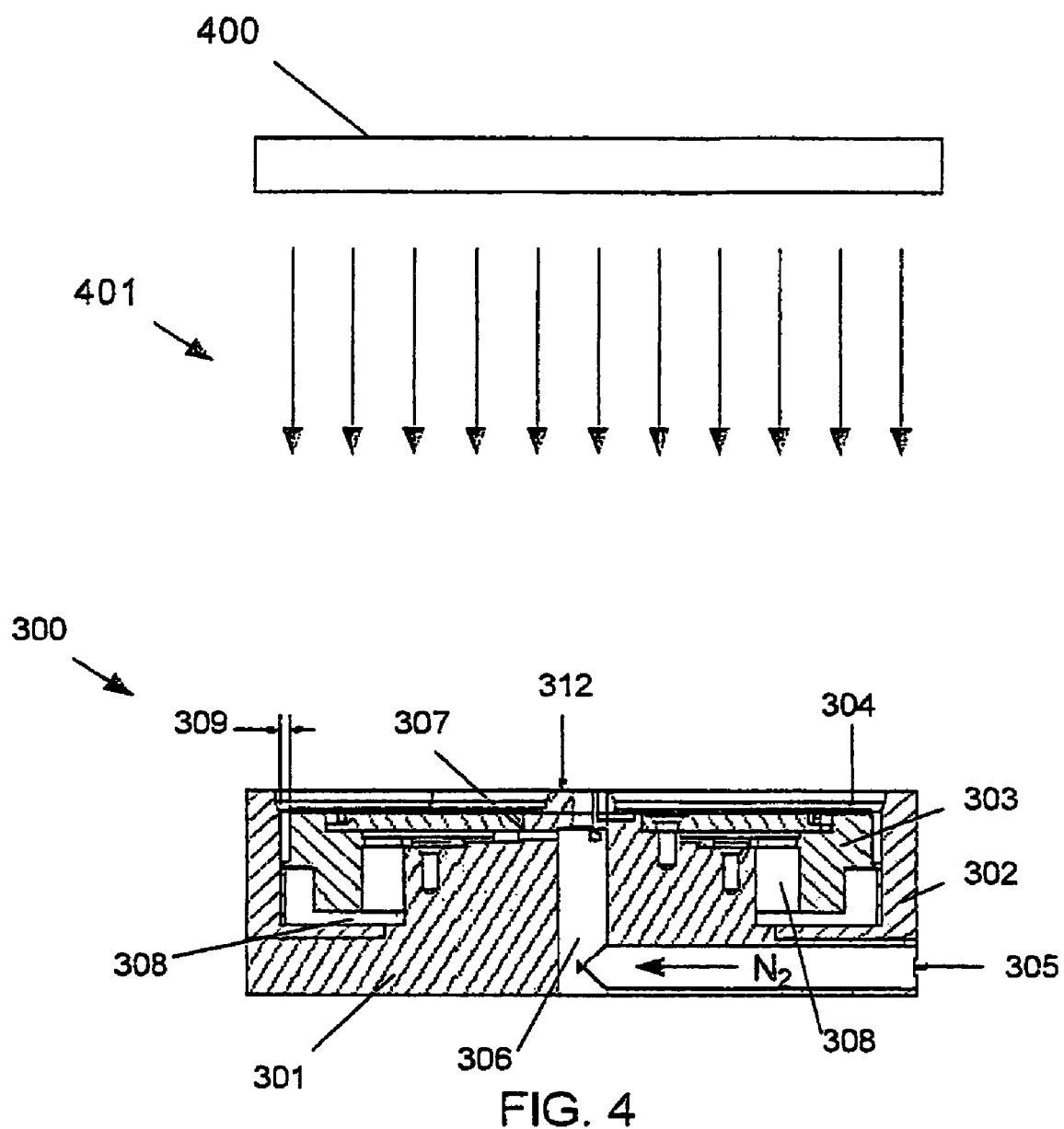
FIG. 4 depicts an exemplary configuration of a fixture, including a light source.

FIG. 4 depicts an exemplary configuration of fixture 300 with respect to a light source 400, such as a solid-state i-light source. Light source 400 emits light energy 401 that is directed toward a CD/DVD work piece (not shown) that is positioned on fixture, or nozzle, 300. It should be understood that while FIG. 4 depicts an exemplary configuration of fixture 300, other fixtures can be used for creating a fluid flow (e.g., of an inert, reactive or catalytic fluid). In one exemplary embodiment, light energy 401 has a wavelength of between about 250 run and 450 nm.

It should be understood that light source 400 could be any type of light source. For example, light source 400 could be a single-emitter light source or a multiple emitter light source, such as an array of single-emitter light sources. Exemplary solid-state light sources that could be used for light source 400 are set forth in PCT Patent Application PCT/US03/14625, filed May 8, 2003, entitled "High Efficiency Solid-State Light Source and Methods of Use and Manufacture," invented by Mark D. Owen et al., and which is incorporated by reference herein. PCT Patent Application PCT/US03/14625 discloses, among other things, high-intensity light sources that are formed by a micro array of semiconductor light sources, such as LEDs, laser diodes, or VCSEL placed densely on a substrate to achieve power density output of at least 50 mW/cm$^2$. The disclosed semiconductor devices are typically attached by a joining process to electrically conductive patterns on the substrate, and driven by a microprocessor-controlled power supply. An optic element may be placed-over the micro array to achieve improved directionality, intensity, and/or spectral purity of the output beam. The light module may be used for such processes as, for example, fluorescence, inspection and measurement, photopolymerization, ionization, sterilization, debris removal, and other photochemical processes.

Additionally, light sources that could be used could optionally include features disclosed by PCT Patent Application PCT/US2004/036370, filed Nov. 1, 2004, entitled "Use of Potting Gels For Fabricating Microoptic Arrays," invented by Duwayne R. Anderson et al., which is incorporated by reference herein. PCT/US2004/036370 discloses, among other things, a lens array for collecting light from a light source such that the lens array is made of a curable gel that remains pliant after curing. The disclosed lens array may be used alone and without a hard epoxy matrix overcoat. The lens array may be used in a solid-state light emitting device array that includes a glass window that covers the solid-state light emitting device and the lens array so that the lens array cannot be physically interfered with or touched directly. An array of collecting microoptical lenses and/or prisms may be molded into the gel, and the gel lens used as an inexpensive array of lighting devices for the purpose of collecting and condensing the light from the solid-state light emitting device array (e.g., so that it is less dispersive).

Further, light sources that could be used could optionally include features disclosed by PCT Patent Application PCT/US2004/036260, filed Oct. 28, 2004, entitled "Collection Optics For LED Array With Offset Hemispherical or Faceted Surfaces," invented by Duwayne R. Anderson et al., which is incorporated by reference herein. PCT Patent Application PCT/US2004/036260 discloses, among other things, an array of LEDs having a lens array for collecting divergent light from each LED. Each lens in the array is associated with a respective LED and has a compound shape including a curved surface that may be spherical or may have an offset aspherical shape. The lens may alternatively include faceted surfaces that approximate the curved lens surface.

Further still, light sources that could be used could optionally include features disclosed by U.S. Non-provisional patent application Ser. No. 11/083,525, filed Mar. 18, 2005, entitled "Direct Cooling of LEDs," invented by Mark D. Owen et al., which is incorporated by reference herein. U.S. Non-provisional patent application Ser. No. 11/083,525 discloses, among other things, a thermal management system for semiconductor devices, such as an LED array, that applies a coolant directly to the LED array. In one exemplary embodiment, the coolant is an optically transparent cooling fluid that flows across the LED array and circulates through a system to remove heat generated by the LED array.

Even further, light sources that could be used could optionally include features disclosed by U.S. Non-provisional patent application Ser. No. 11/084,466, filed Mar. 18, 2005, entitled "Micro-reflectors on a Substrate for High-Density LED Array," invented by Mark D. Owen et al., which is incorporated by reference herein. U.S. Non-provisional patent application Ser. No. 11/084,466 discloses, among other things, an optical array module that includes a plurality of semiconductor devices mounted on a thermal substrate formed with a plurality of openings that function as micro-reflectors, such that each micro-reflector includes a layer of reflective and conductive material to reflect light and to electrically power its associated semiconductor device.

Additionally, light sources that could be used could optionally include features disclosed by U.S. Non-provisional patent application Ser. No. 11/104,954, filed Apr. 12, 2005, entitled "High Density LED Array," invented by Duwayne R. Anderson et al., which is incorporated by reference herein. U.S. Non-provisional patent application Ser. No. 11/104,954 discloses, among other things, a dense array of semiconductor devices having an array of micro-reflectors, such that the micro-reflectors have characteristics that enhance dense packing of the array in balance with collection and collimation of the array's radiant output.

Returning to FIGS. 3 and 4, nitrogen is introduced into first radially oriented fluid channel 305. The nitrogen passes from channel 305 into longitudinally oriented fluid channel 306 and into second radially oriented fluid channel 307. The nitrogen is coupled from fluid channel 307 into fluid cavity 308 through apertures in inner ring member 303 (See FIGS. 7A-7D.)

Fluid flow of about 0.5 to 6 liter/min is a particular flow contemplated in this example embodiment. This flow may be variously established. As an example, this flow may be established via selection of one or more of the nozzle spacing, flow distance and volume in the fixture.

A Reynolds Number below about 1000 is a target for the aforementioned flow conditions for gases with a range of temperatures from about 25-125 degrees Celsius or lower. The density for nitrogen is taken as 0.89 g/l. The physical depth of the fixture limits the length of the flow (e.g., to about 10 mm based on the above example embodiment), which is taken to be the characteristic distance for calculation of the Reynolds number.

The Reynolds Number is given by the formula: $R=\rho VD/\mu$ (1) in which, $\rho$ is the density in g/l, V the flow velocity, D is the characteristic distance in m and $\mu$ is the viscosity in Poise (Pa s).

The flow velocity through the fixture is obtained by computing the volume of the flow area between the inner and outer cylinder of the fixture (subtracting the volume of the inner cylinder from the outer cylinder), computing the residence time in the volume for the aforementioned flows, and dividing the length of the flow distance by the residence time. For example, for a 1 mm flow channel between the inner and outer channel the volume is 0.00102 l, resulting in a residence time of 0.0102 s (0.1 l/s flow) and a flow velocity of 0.98 m/s. Thus, $R=0.89$ g/l (0.98 m/s) 0.010 m/0.000018=484. (2)

Similarly, for a 2 mm flow channel between the inner and outer channel the volume is 0.0038 l, resulting in a residence time of 0.038 s (0.1 l/s flow) and a flow velocity of 0.26 m/s. Thus, $R=0.89$ g/l (0.26 m/s) 0.010 m/0.000018=128. (3)

In one exemplary embodiment, flow channel 309 (FIG. 3) is selected to be 2 mm in order to allow for lower Reynolds Numbers even at higher flow velocities.

Returning to FIG. 3, the nitrogen passes through gap 309 between outer ring member 302 and inner ring member 303, thereby providing a fluid flow of an inert fluid, in this case, nitrogen, across the edge of a CD/DVD work piece (not shown). That is, the fluid flow of the inert fluid produced by fixture 300 is substantially parallel to the edge surface of the work piece, in this case, a CD/DVD. UV-light energy 401 from solid-state UV-light source 400 causes the adhesive resin between the discs of the CD/DVD to photoreact and cure. With such light energy applied, the fluid flow provides for photoreaction and cure without forming a tacky cure at the edge of the CD/DVD. It should be understood that other inert fluids could alternatively be used.

FIG. 9 illustrates a basic construction of an exemplary embodiment of a lighting module 900 having a plurality of solid-state light emitters, such as LED chips 901 mounted or otherwise disposed in a dense array on a substrate 902. LED chips 901 and substrate 902 are thermally coupled to a heat sink 903. A variety of LED chips are commercially available across a spectral range of visible and invisible light, and a person skilled in the art may select an LED chip depending on the application of intended use. One exemplary LED chip that is suitable for material transformation applications, such as curing, is P/N C395-XB290-E0400-X, manufactured by Cree, Inc., located in Durham, N.C., USA. Module 900 is connected to a power source 904 to power LED chips 901 that produce light output of a wavelength and an intensity to perform a desired operation. Heat sink 903 can be made from, for example, aluminum. The spacing or density of LED chips 901 on substrate 902 is determined, among other bases, by the power density output requirements of the desired operation.

Figure 5A:
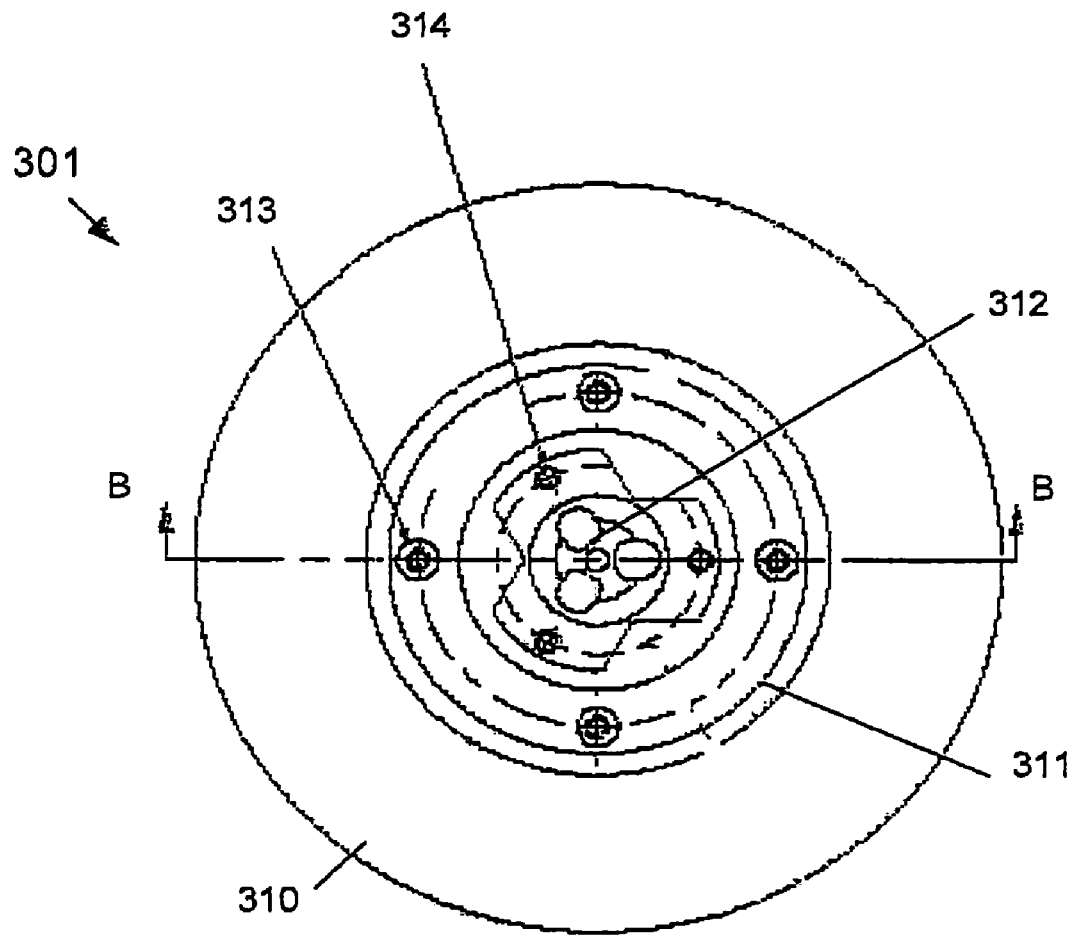
FIG. 5A depicts a top view of an exemplary embodiment of a spindle base shown in FIGS. 3A and 3B.
Figure 5B:
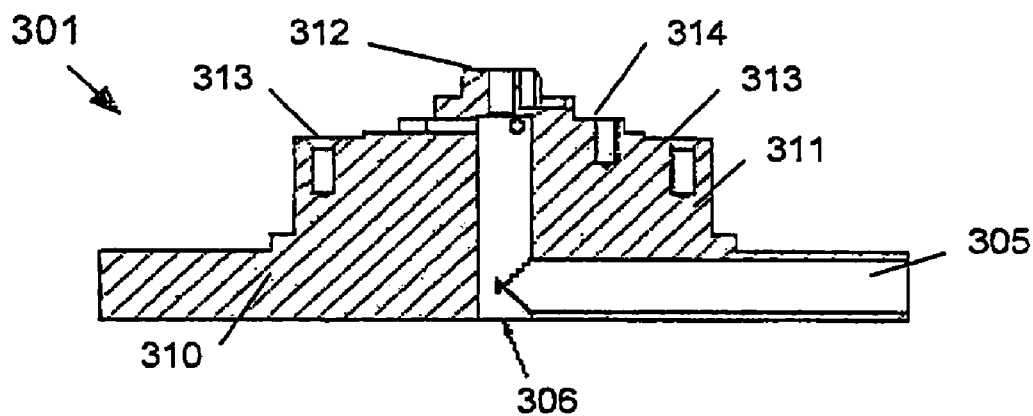
FIG. 5B depicts a cross-sectional view of an exemplary embodiment of the spindle base shown in FIG. 5A taken along line B-B.
Figure 5C:
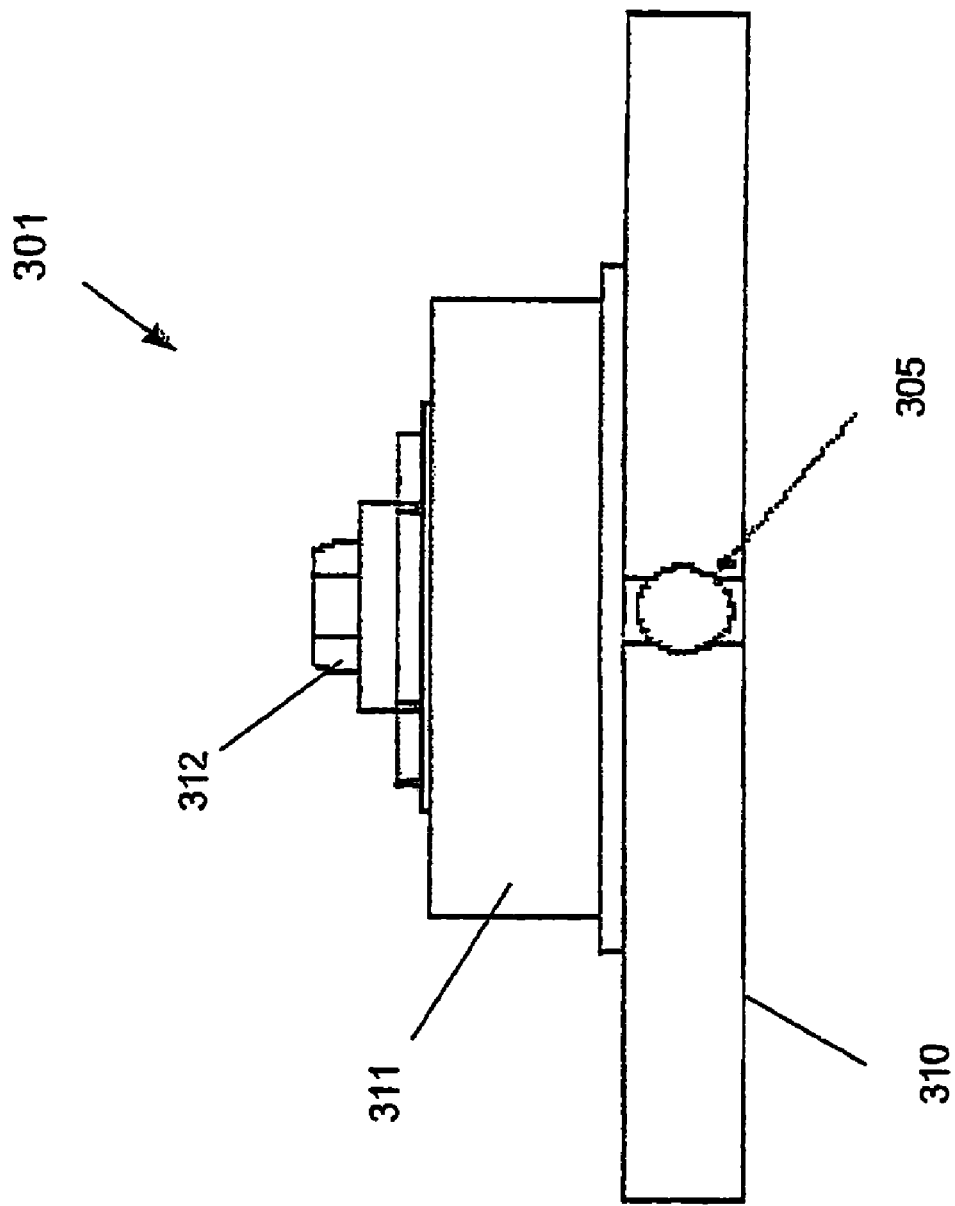
FIG. 5C depicts a side view of the exemplary embodiment of the spindle base shown in FIG. 5A.
Figure 5D:
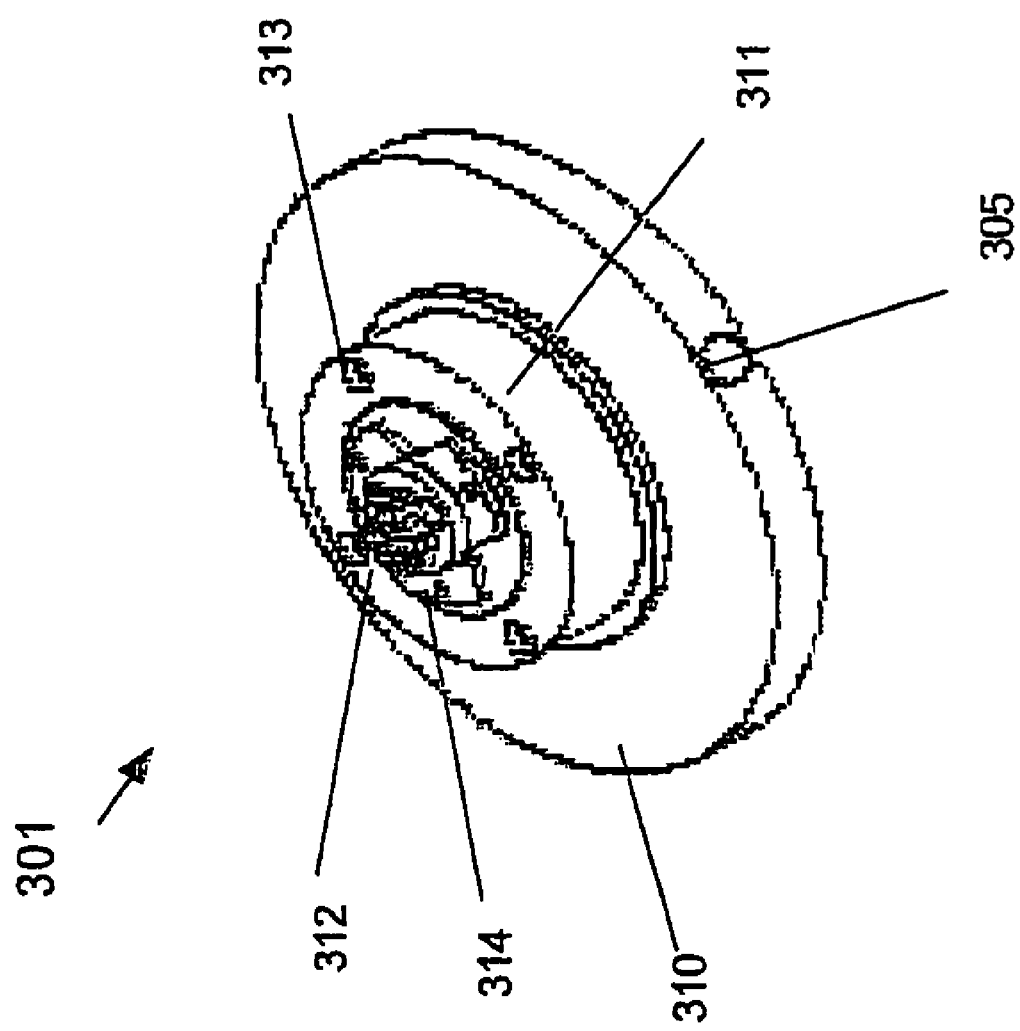
FIG. 5D depicts a perspective view of the exemplary embodiment of the spindle base shown in FIG. 5A.

FIG. 5A depicts a top view of an exemplary embodiment of spindle base 301 shown in FIGS. 3A and 3B. FIG. 5B depicts a cross-sectional view of the exemplary embodiment of spindle base 301 shown in FIG. 5A taken along line B-B. FIG. 5C depicts a side view of the exemplary embodiment of spindle base 301 shown in FIG. 5A. FIG. 5D depicts a perspective view of the exemplary embodiment of spindle base 301 shown in FIG. 5A. Spindle base 301 includes a base portion 310, a shoulder portion 311 and a spindle 312. Base portion 310 includes radially oriented fluid channel 305 and longitudinally oriented fluid channel 306. Shoulder portion 311 includes blind screw holes 313 that are used for attaching inner ring member 303 to shoulder portion 311, and blind screw holes 314 that are used for attaching platter 304 to shoulder portion 311.

FIG. 6A depicts a top view of an exemplary embodiment of outer ring member 302 shown in FIGS. 3A and 3B. FIG. 6B depicts a cross-sectional view of the exemplary embodiment of outer ring member 302 shown in FIG. 6A taken along line C-C. FIG. 6C depicts a perspective view of the exemplary embodiment of outer ring member 302 shown in FIG. 6A. Outer ring member 302 includes a bottom 315, a side wall portion 316 and a center aperture 317 that is formed in bottom 315.

Figure 7D:
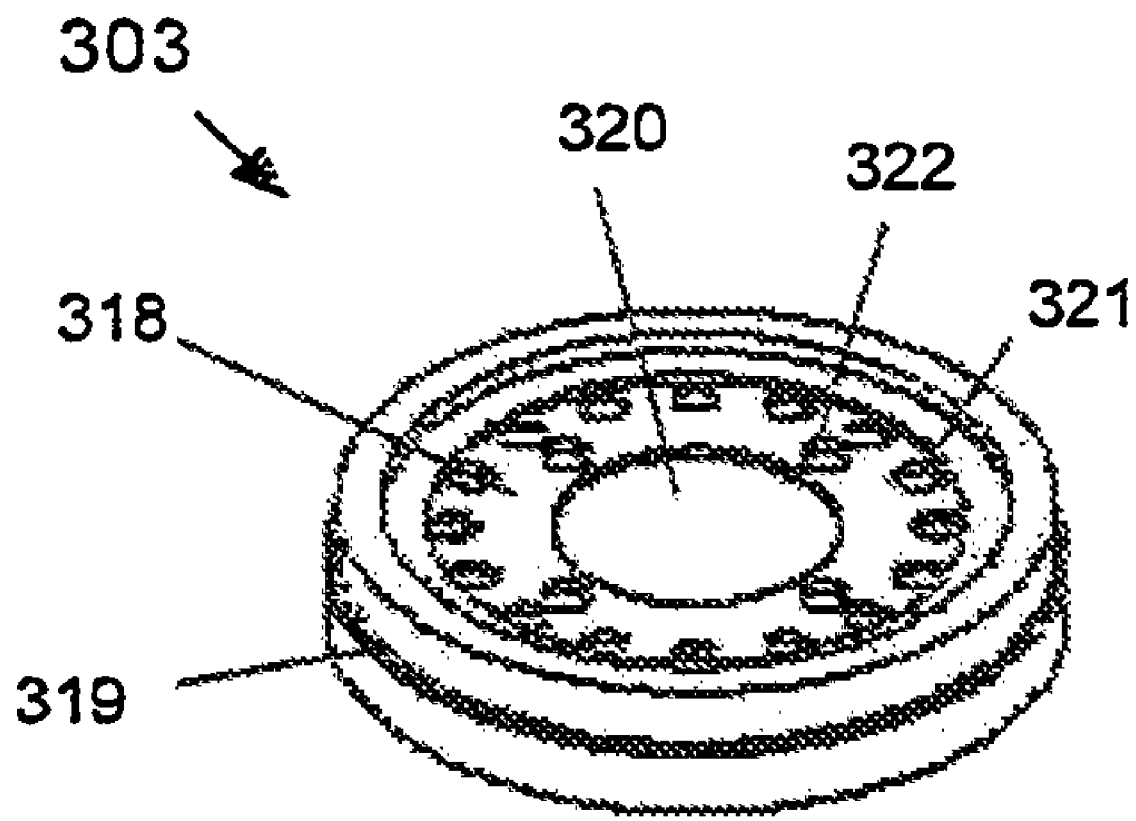
FIG. 7D depicts a perspective view of the exemplary embodiment of the inner ring member shown in FIG. 7A.

FIG. 7A depicts a top view of an exemplary embodiment of inner ring member 303 shown in FIGS. 3A and 3B. FIG. 7B depicts a cross-sectional view of the exemplary embodiment of inner ring member 303 shown in FIG. 7A taken along line D-D. FIG. 7C depicts a side view of the exemplary embodiment of inner ring member 303 shown in FIG. 7A. FIG. 7D depicts a perspective view of the exemplary embodiment of inner ring member 303 shown in FIG. 7A. Inner ring member 303 includes a central portion 318, a side wall portion 319, and a central aperture 320 formed in central portion 318. Central portion also includes fluid passage apertures 321 and mounting apertures 322. Fluid passes from second radial fluid channel 307 to fluid cavity 308 through fluid passage apertures 321. Mounting apertures 322 align with blind screw holes 313 in shoulder portion 311 of spindle base 301 so that inner ring member 303 can be mounted on spindle base 301 using screws (not shown).

Figure 8C:
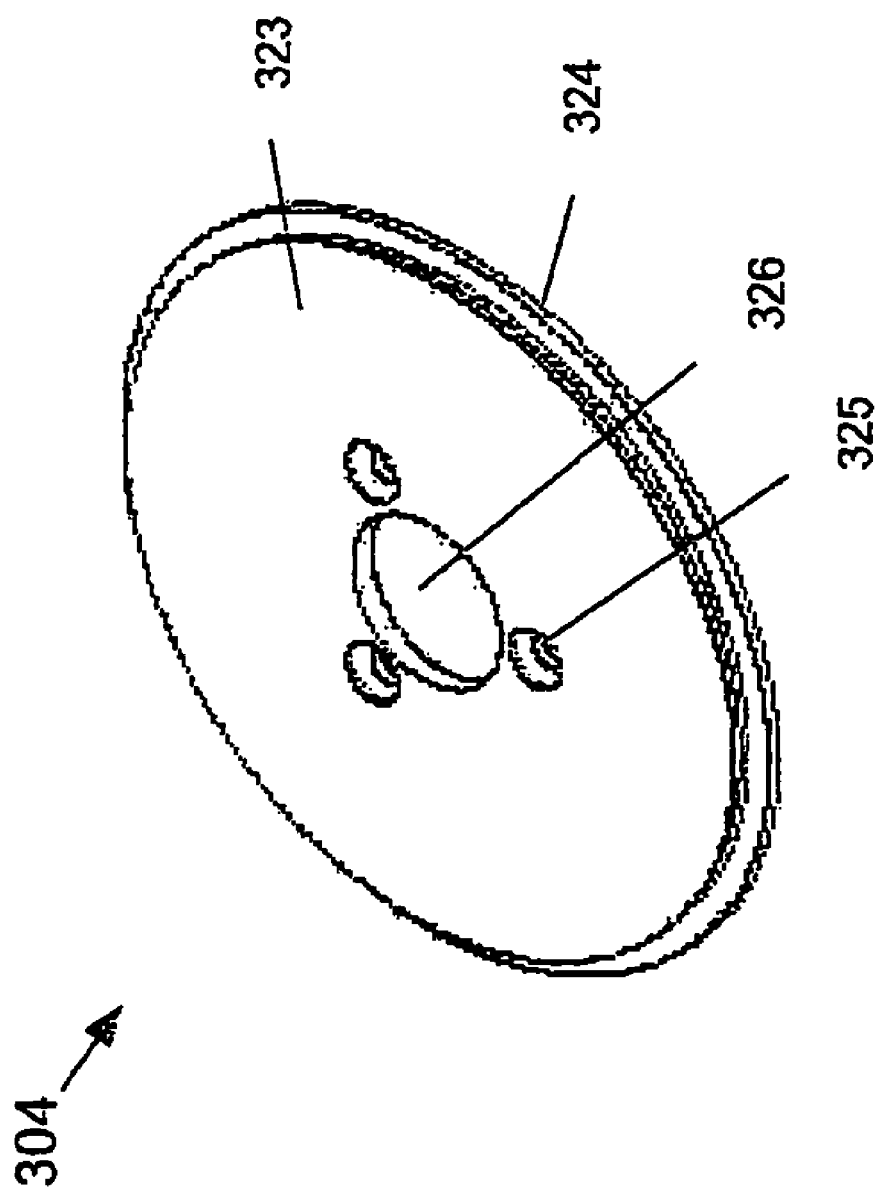
FIG. 8C depicts a perspective view of the exemplary embodiment of platter the shown in FIG. 8A.

FIG. 8A depicts a top view of an exemplary embodiment of platter 304 shown in FIGS. 3A and 3B. FIG. 8B depicts a side view of the exemplary embodiment of platter 304 shown in FIG. 8A. FIG. 8C depicts a perspective view of the exemplary embodiment of platter 304 shown in FIG. 8A. Platter 304 includes a central portion 323 and an outer edge portion 324. Additionally, platter 302 includes apertures 325 (of which only one is indicated by reference numeral in the Figure) for mounting platter 304 to shoulder portion 311 of spindle base 301, and central aperture 326 for spindle 312.

The inventive subject matter disclosed-herein can be conveniently utilized with various sources of inert fluid. In an example embodiment, the fluid may be generated on-site. To illustrate this embodiment, if the inerting fluid comprises nitrogen, the most common gas in the Earth's atmosphere, the source of nitrogen may be a facility on-site that produces the nitrogen using any conventional technique. Moreover, because compressed air is generally implicated for other uses by CD/DVD production equipment, a compressed-air system typically is readily adaptable in connection with supply of nitrogen, e.g., to provide the power to drive a pump that establishes the fluid flow of nitrogen as an inert fluid.

In some applications, either/both on-site production of nitrogen and/or use of compressed air in connection with the fluid's supply can be problematic because of a need for extremely high levels of the fluid's purity for and in connection with a chemical reaction. If, for conventional UV sheet-fed drying under oxygen-reduced conditions, it is assumed that the residual oxygen concentration of 1-3% is sufficient for a well cross-linking of the printing inks or of the coating, there is the possibility of achieving the required effect by a fluid flow of nitrogen, which is led to the printed or coated sheet surface before passing a UV-unit. It is known that a relatively modest purity (based on the standards required by the semiconductor industry) is sufficient for overcoming the problem of oxygen inhibition. Thus, the inventive subject matter disclosed herein provides that on-site production of nitrogen for the manufacture of CD/DVDs and/or use of compressed air in connection with driving the nitrogen supply may be cost effective and readily implemented, provided such production/drive may be employed while also maintaining any requirements of fluid flow purity (e.g., purity of the nitrogen applied to inert the surface).

In another exemplary embodiment, materials that are coated with polymer formulations that have planar surfaces can be inerted using the techniques according to the inventive subject matter disclosed herein. An example is in the printing of heat sensitive print media using piezo ink jet heads. In this case, the pinning or setting of the ink is accomplished by low-power exposure to UV light, and the final cure can be done using the exemplary embodiment of a fluid-flow for graphic media. Operation would be analogous to processes described above. In a particular example, operation would be directed using a Reynolds Number as the criteria for establishing a desired fluid flow.

Such an approach lowers the concentration of oxygen to a desired level at desired location(s). To illustrate, the oxygen concentration may be lowered to below about 0.5%. In any case, the lowing generally is toward mitigating (e.g., eliminating) the inhibiting action of oxygen on the polymer of the print media, thereby enabling a number of methods in printing processes in which a dry, high gloss finished is desired within a desired time frame (e.g., a number of seconds). While the described application is a specific application, it should be understood that the inventive subject matter disclosed herein is not limited to applications involving gantry printers and/or roll-to-roll processes.

Additionally, the inventive subject matter disclosed herein tends not load the CD/DVD layers with additional unnecessary, and/or undesirable, energy. This is accomplished, for example, by providing a light source having a selected wavelength band. Doing so limits the wavelength experienced by the part to a wavelength band that is useful for causing a chemical photoreaction. For example, one exemplary embodiment of the inventive subject-matter disclosed herein utilizes a wavelength-specific light source, such as an LED array, for selectively coupling sufficient radiant energy into, for example, an adhesive layer between the front and backside of the polycarbonate disc layers of a CD/DVD, despite absorption losses in the front/backside disc. Another exemplary alternative embodiment of the inventive subject matter disclosed herein utilized a light source, such as an LED array or a laser, that couples into anaerobic and aerobic areas of, for example, a CD/DVD through a high transmission surface of axial symmetry. A third exemplary embodiment of the inventive subject matter disclosed herein utilizes a first light source for curing an anaerobic portion of, for example, the edge of a CD/DVD, and a second light source for curing an aerobic portion of, for example, the bulk region of a CD/DVD. For the third exemplary embodiment, an LED array is used for the first light source and a laser is used for achieving a higher energy density than is used for curing the aerobic portion of a CD/DVD.

While a specific exemplary embodiment has been disclosed that relates to a bonding operation for a CD/DVD, it should be understood that the inventive subject matter disclosed herein is also applicable to any number of alternative applications relating to ink, graphic arts, industrial coatings, paints, bonding techniques, adhesive applications and various other similar-type application. For example, the inventive subject matter disclosed herein is applicable to a photoreaction curing an ink formulation on a substrate, including but not limited to labels, point of sales displays, polyethylene substrates, polyurethane substrates, packaging substrates, coated packaging substrates, screened inks, paper substrates, and plastic substrates. Additionally, the inventive subject matter disclosed herein is applicable to a photoreaction curing a coating, including but not limited to clear coats, paint coats, protective coats, encapsulants, conformal coatings, and dielectric coatings.

Persons of ordinary skill in the art will recognize modifications and variations that are possible in the details and arrangements of the exemplary embodiments set forth above, including the various parts and actions thereof, and that such modifications and variations may be practiced that are within the scope of the appended claims. Accordingly, the exemplary embodiments are to be considered illustrative, and not restrictive or exhaustive. Moreover, the inventive subject matter disclosed herein is not, and is not to be, limited to the exemplary embodiments, or the details and arrangements, disclosed herein, and the claims may be modified within the scope and equivalents of the original filing.

All patent literature and non-patent literature cited herein are hereby incorporated by reference as if recited in full herein for all purposes, as well as the disclosures and claims attached hereto as the APPENDIX.

What is claimed is:

1. A light module comprising:
   an array of solid-state light emitters mounted on or formed in a thermally transmissive substrate providing electrical circuitry patterns for coupling with the solid-state emitters;
   a lens array layer disposed over the array of solid-state emitters, the lens array having a plurality of lenses formed therein, each lens being optically coupled to one or more light emitters, the lens array being adjacent to the emitters and the substrate surrounding individual emitters;
   a temperature control system for dissipating heat away from the light emitters; and
   a power control subsystem electrically coupled to the array of solid-state light emitters, the power control subsystem comprising a microprocessor and a power supply, the microprocessor electrically coupled to the power supply to control power provided to the array of solid-state light emitters.

2. The light module of claim 1, the microprocessor further to control power provided to the array of solid-state light emitters according to a power waveform of one of, or any combination of two or more of: pulsed power supplied at regular, repeating or varying on/off periods or frequencies; pulsed power supplied at any of various current levels; pulsed power supplied at currents greater than the solid-state light emitter's specifications; pulsed power supplied at varying current levels; pulsed power supplied at ramped up current levels; pulsed power supplied at ramped down current levels; arbitrary voltage and current supplied at any of various pulse repetition rates and duty cycles; and power supplied with sinusoidal or sinusoid-like variations in current levels.

3. The lighting module of claim 1, wherein the array of solid-state light emitters are arranged according to a desired optical power density.

4. The lighting module of claim 1, further comprising a common controller coupled to the light emitters.

5. The lighting module of claim 1, further comprising a fixture for holding a work object the fixture arranged relative to the light module so that a work object may be exposed to light from the module to effect a curing of the work object with a predetermined wavelength of light for effecting the curing.

6. The lighting module of claim 5, wherein the predetermined wavelength of light comprises a wavelength suitable for curing one of ink, adhesives or coatings.

* * * * *